United States Patent Office 3,245,445
Patented Apr. 12, 1966

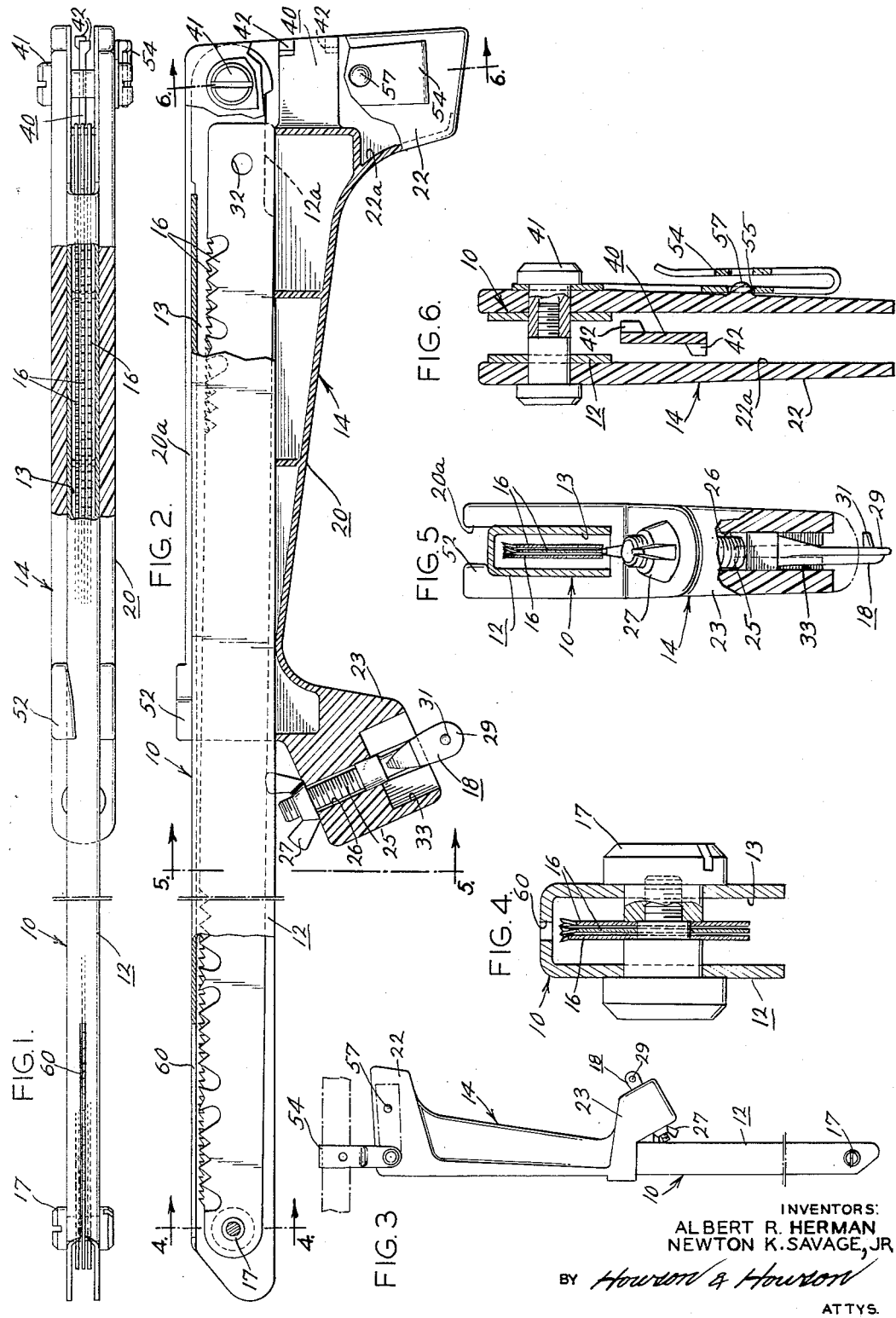

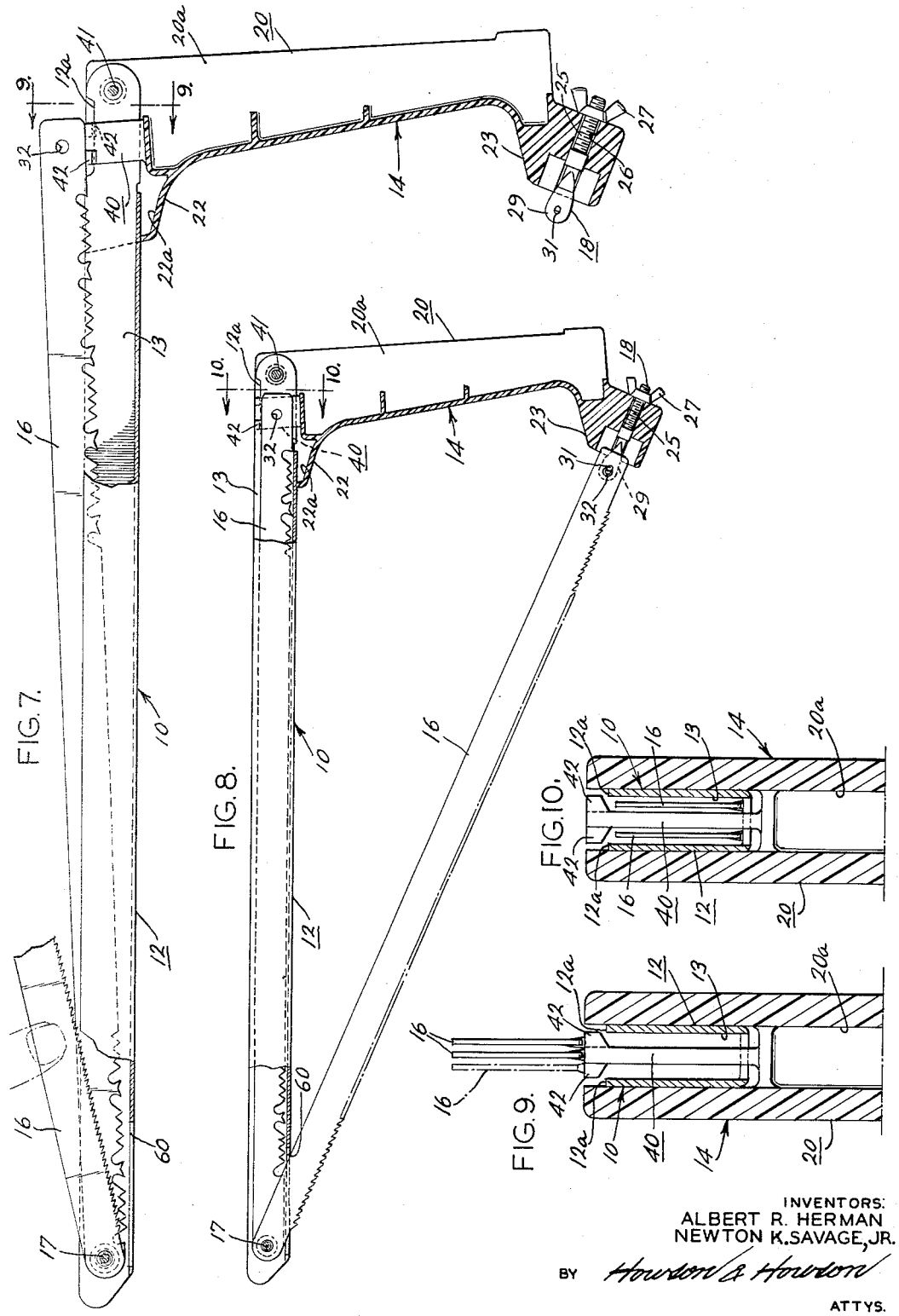

3,245,445
FOLDING SAW
Albert Richard Herman and Newton Kline Savage, Jr.,
both of R.D. 1, Elverson, Pa.
Filed Jan. 22, 1964, Ser. No. 339,426
11 Claims. (Cl. 145—33)

This invention relates to an improved type of folding or collapsible saw.

The saw of the present invention is characterized by novel features of construction and arrangement facilitating easy and quick disposition of the parts of the saw in a set up position ready for use and a compact collapsed position when not in use. To this end, the saw, which is comprised of comparatively few parts, includes a handle and an elongated channel shaped frame which is pivotally connected at one end to the handle. The channel shaped frame defines a magazine, in the present instance, for a plurality of saw blades each pivotally mounted at one end to the other end of the frame. In the collapsed position of the saw, the saw blades lie in the magazine and the handle is detachably latched to the frame in a position overlying a portion of the open side of the frame to retain the saw blades in the magazine. When it is desired to use the saw, the handle is pivoted relative to the frame to permit a selected one of the saw blades to be pivoted out of the magazine and secured to the free end of the handle.

It is noted that since all of the major parts of the saw, for example, the frame, handle, and blades are pivotally connected to one another, the arrangement thereof between a collapsed and a set up position is very simple and may be accomplished quickly. Further, this arrangement obviates tedious and time consuming assembly problems and eliminates the possibility of loss of parts of the saw.

Other features of the saw includes means for automatically displacing blades out of the magazine when the handle is pivoted to set up the saw to present them to the user for selection and means for retaining those blades not selected in the cartridge so that they do not interfere with normal use of the saw.

Thus, in the folded or collapsed position of the saw, there is provided a compact, light-weight assembly which is readily portable, the parts of which may be easily positioned for use in the set up position and provide a sturdy and durable tool.

With the foregoing in mind, a primary object of the present invention is to provide a novel saw construction, the parts of which may be arranged easily and quickly between a collapsed position wherein the parts of the saw are nested relative to one another to provide a compact, readily portable arrangement and a set up position ready for use.

Another object of the present invention is to provide a convertible or collapsible saw of the above type operable to accommodate a plurality of saw blades which may be interchanged readily without complete disassembly of parts of the saw.

Still a further object of the present invention is to provide a compact, collapsible saw comprised of relatively few parts which is easy and economical to manufacture and is useful for the purposes intended.

These and other objects of the present invention and various features and details of the construction, use and operation thereof are hereinafter more fully set forth with reference to the accompanying drawings, in which:

FIG. 1 is a plan view partly in section of a saw in accordance with the present invention in the collapsed position;

FIG. 2 is a side elevational view partly in section of the saw shown in FIG. 1;

FIG. 3 is a side elevational view of the saw in the collapsed position supported on a belt of a user;

FIGS. 4, 5 and 6 are enlarged sectional views taken on lines 4—4, 5—5, and 6—6 of FIG. 2;

FIG. 7 is a side elevational view partly in section of a saw in the partially set up position;

FIG. 8 is a slide elevation view partly in section of the saw in the set up position; and FIGS. 9 and 10 are enlarged sectional views taken on lines 9—9 and 10—10 of FIGS. 7 and 8 respectively.

Referring now to the drawings and particularly to FIGS. 1 and 2 thereof, there is shown a saw 10 constructed in accordance with the present invention. The saw 10 comprises an elongated frame member 12 of channel shape in cross section defining a magazine 13, in the present instance, for a plurality of saw blades 16, and a handle 14 pivotally connected to one end of said frame member. The blades 16 are each pivotally connected to the other or outer end of the frame member 12 remote from the handle 14 by means of a two-piece fastener 17 adapted to support the blades for free pivotal movement relative to the frame centrally of the magazine 13 to and from a storage position in the magazine. The handle 14 has an offset extension 23 at its free end which supports or carries a blade tightening element 18 to which the free end of a saw blade 16 is attached in the set up position of the saw. (See FIG. 8.) The blade tightening element 18 is conventional and comprises the usual threaded shank portion 25 which is received in a cylindrical opening 26 in the offset handle extension 23 and which mounts at one end a thumb nut 27, and a flattened portion 29 at the opposite end of the shank 25 which carries a pin 31 to engage in an aperture 32 in the free end of the saw blades 16. A narrow slotted opening 33 is provided in the offset handle extension 23 within which the flattened portion 29 of the shank is received to prevent turning of the blade tightening element 18 when turning the thumb nut 27 to tension a blade 16.

In accordance with the present invention, the saw is characterized by novel features of construction and arrangement facilitating disposition of the parts of the saw easily and quickly between a set up position ready for use and collapsed or folded position. To this end, the handle 14 comprises a hand-grip portion 20 of U-shaped cross section to define a pocket 20a and a short leg portion 22 extending transversely from the end of the hand grip portion remote from the offset handle extension 23 and also of U-shaped cross section to define a hollow seat 22a. The handle is pivotally connected to the rear terminal end of the frame at the corner of the juncture of the hand grip and leg portions by means of a two-piece fastener 41 comprising mating male and female elements which permits free pivotal movement of the handle and frame.

By this construction, the handle 14 may be rotated about its pivotal connection to the frame between a collapsed position overlaying at least a portion of the open side of the frame to retain the saw blades 16 in the magazine 13 and a projected position relative to the frame to permit a saw blade 16 to be swung about its pivot out of the magazine 13 so that a selected saw blade 16 may be secured to the free end of the handle 14. More particularly, in the collapsed position, a portion of the frame 12 nests in the pocket 20a of the handle with the open side of the frame 12 adjacent the opposite end to which the blades are pivotally connected confronting the closed side of the pocket 20a whereby the saw blades 16 are retained in the magazine. (See FIGS. 1 and 2.) The handle is locked in this position by means of a locking tab 52 formed as an integral extension of the free side edge of one of the opposing side walls of the hand grip portion 20, the tab 52 as illustrated in FIG. 5 engaging over the closed bottom side of the channel shaped frame 12 to detachably secure the handle in place. It is noted that in this position, the thumb nut 27 of the blade tightening element 18 is disposed or positioned relative to the frame so that a wing thereof engages either in the open side or to one side of the frame member 12 to limit turning thereof relative to the shank thereby minimizing the chance of losing these parts accidentally. Further, it is noted that in this position the saw teeth confront the closed side of the frame 12 and only the blunt edge of the saw blades is exposed through a portion of the open side of the frame 12. By this arrangement, injury to persons handling the saw resulting from contact with the teeth of the saw blades 16 is obviated and also eliminated is the chance of catching the saw blades 16 on articles of wearing apparel or the like. The collapsed saw may be stored on a rack or carried on the person and to this end a clip 54 is pivotally connected to the handle to support the collapsed saw on the belt of a user or on a bracket when the saw is not in use. (See FIG. 3.) One arm of the clip 54 has an opening 55 therein which registers with and engages over a button 57 on the side wall of the leg portion of the handle when the saw is in use. (See FIG. 6.)

Now when it is desired to use the saw, the handle 14 is pivoted in a counterclockwise direction with respect to the frame 12 with reference to FIG. 2. This may be accomplished by gripping the frame 12 with one hand and the handle portion with the other hand and separating the two, the side wall of the handle 14 mounting the locking tab 52 being resilient enough to permit the handle to be disengaged from the frame 12.

The handle 14 and frame 12 are pivoted relative to one another to a position where the hand grip portion 20 is disposed approximately 90° to the frame 12 and wherein the frame is nested in the seat 22a defined by the hollow leg portion 22. (See FIG. 7.) It is noted that as the handle 14 is rotated to this position, a web-like member 40 having an enlarged head defined by lugs 42 projecting from opposite side edges of the web 40 passes through the channel member engaging all of the saw blades housed therein thereby to present them to the user for selection. The user then selects one of the blades 16 to be used and pivots it in a counterclockwise direction as illustrated in FIG. 7 so that its free end may be attached to the blade tightening element 18. The two blades not selected are then recessed back into the magazine 13. This is done one blade at a time. Thus, one of the unselected blades is positioned in the space between the lug 42 on one side of the web 40 and the side wall of the frame 12 and pressed downwardly into the magazine. It is noted that the free edges of the side wall of the frame are undercut as at 12a to permit the web to yield slightly to one side to permit passage of the blade into the magazine 13. The other unselected blade is inserted in the same manner. When so in place, as illustrated in FIG. 10, the lugs 42 retain the unselected blades in the magazine so that they do not interfere with the normal use of the saw. The selected blade is attached to the blade tightening element 18 in a conventional manner; that is, by loosening the thumb nut 27 so that the pin engages in the aperture in the free end of the saw blade 16. The thumb nut 27 is then tightened until the blade 16 is taut. It is noted that the frame member 12 has a narrow slotted opening 60 in its closed side adjacent the front end thereof which braces the end of the saw blade connected to the frame in the set up position of the saw. The opposite end of the saw blade is recessed by the blade tightening element 18 into the slotted opening 33 in the handle extension 23 to brace or rigidify this end of the blade. The particular construction and arrangement of the saw provide a compact, readily portable unit when the saw is collapsed and a sturdy tool when set up for use. After use, the saw is folded and collapsed for transportation or storage by following the foregoing steps in reverse order.

During the use of the saw, if one of the other blades is required, it is merely necessary to loosen the thumb nut 27, detach the free end of the saw blade therefrom, and pivot it in a clockwise direction relative to FIG. 8 so that it engages the top of the web 40. The handle 14 is then cocked or pivoted counterclockwise relative to the frame 12 to retract the web 40 from the magazine and then the handle 14 is again pumped back so that the web 40 displaces all of the blades for selection to the user. The new blade is then withdrawn from the pack and assembled in the manner indicated above.

While a particular embodiment of the present invention has been illustrated and described herein, it is not intended to limit the invention and changes and modifications may be made therein within the scope of the following claims.

We claim:

1. A saw comprising an elongated, hollow, open-sided frame defining a magazine, at least one saw blade pivotally connected at one end thereof to one end of said frame and pivotable to and from a storage position within the magazine, a handle pivotally connected to the other end of said frame and rotatable relative to said frame between a collapsed position operable to retain said saw blade in storage position in said magazine and a projected position relative to said frame to permit said blade to be swung about its pivot outwardly of the magazine to a position angularly with respect thereto with the free end of the blade disposed adjacent the projected handle, means to detachably connect the free end of the blade to the projected handle, means to detachably latch said handle to said frame in the collapsed position of the handle and a member carried by said handle operable to pivot the saw blade outwardly from said magazine upon pivotal movement of the handle relative to the frame from said collapsed position to said projected position.

2. A saw comprising an elongated, hollow, open-sided frame defining a magazine, at least one saw blade pivotally connected at one end thereof to one end of said frame and pivotable to and from a storage position in said magazine, a handle pivotally connected to the other end of said frame, said handle comprising a hand grip portion of U-shaped cross section to define a pocket and a leg portion extending transversely of said hand grip portion of U-shaped cross section to define a hollow seat, a blade tightening element carried by the free end of said hand grip portion opposite said leg portion, said handle being rotatable relative to said frame between a collapsed position wherein a portion of said frame adjacent said other end is nested in said pocket with the open side of said frame confronting the closed side of said pocket to retain the saw blade in said magazine and a projected position wherein said handle extends approximately normal to said frame and said other end of said frame is nested in said hollow seat and the open side of said frame is exposed to permit a blade to be swung about its pivot outwardly of said magazine, fastening means to detachably connect the free end of said blade to the projected handle, means detachably securing the handle to said frame in said collapsed position, a web mounted centrally of the seat of said leg portion operable upon pivotal movement of said handle relative to said frame to the projected position to engage the free end of said saw blade and displace it from said magazine.

3. A saw comprising an elongated, hollow, open-sided frame defining a magazine, at least one saw blade at one end pivotally connected to one end of said frame, a handle pivotally connected to the other end of said frame, said handle comprising a hand grip portion of U-shaped cross section and a leg portion extending transversely of said hand grip portion of U-shaped cross section to define a hollow seat, said handle being rotatable relative to said frame between a collapsed position wherein said hand grip portion overlies at least a portion of the open side of the frame to retain the saw blade in said magazine and a projected position wherein said handle extends approximately normal to said frame and said other end of said frame is nested in said hollow seat and the open side of said frame is exposed to permit a blade to be swung about its pivot outwardly of said magazine, a web mounted centrally of the seat of said leg portion operable upon pivotal movement of said handle relative to said frame to the projected position to engage the free end of said saw blade and displace it from said magazine.

4. A saw as claimed in claim 3 including a plurality of saw blades and wherein said web includes a pair of locking lugs extending from opposite side edges of the free end of said web which in the projected position of the handle are adapted to retain the non-selected blades in the magazine.

5. A saw comprising an elongated, hollow, open-sided frame defining a magazine, a plurality of blades pivotally connected at one end thereof to one end of said frame and selectively pivotable to and from a storage position within the magazine, a handle pivotally connected to the other end of said frame and adapted to be disposed in a collapsed position overlying at least a portion of the open side of said frame to retain said saw blades in storage position in said magazine, and a projected position relative to said frame to permit a selected one of said blades to be swung about its pivotal connection outwardly of the magazine to a position angularly with respect thereto with the free end of the selected blade disposed adjacent the projected handle, a member carried by said handle operable to pivot the saw blades outwardly from said magazine upon pivotal movement of the handle relative to the frame from said collapsed position to said projected position to present the blades for selection and means to detachably secure said handle to said frame in the collapsed position of the handle.

6. A saw as claimed in claim 5 wherein said member comprises a web projecting from said handle and a pair of locking lugs extending from opposite side edges of the free end of said web which in the projected position of the handle are adapted to retain non-selected blades in the magazine.

7. A collapsible saw comprising an elongated, rigid, unitary, hollow open-sided frame member defining a magazine, at least one saw blade dimensioned to be received in the magazine defined by said frame member, means pivotally connecting one end of said directly to one end of said frame member for pivotal movement of said blade about said pivot means to and from a storage position within the magazine and an operating position angularly disposed with respect to the frame member at the opposite side thereof from said magazine, a one-piece handle member, means pivotally connecting one end of said handle member directly to the other end of said frame member for rotation of the handle member about said pivot means relative to the frame between a collapsed position overlying at least a portion of the open side of said frame member and an operating position projecting from the opposite side of the frame member with the free end of said handle member disposed adjacent the free end of said blade when the latter is pivoted to its said operating position, means on said handle for detachably latching said handle to said frame in the collapsed position of the handle to retain said blade in storage position in said magazine, and fastening means to connect said free end of the blade to said free end of the projected handle and apply the desired degree of tension to the blade.

8. A collapsible saw as claimed in claim 7 wherein said means for detachably latching said handle to said frame comprises a lug carried by said handle operable to engage with said frame in the collapsed position of the handle.

9. A collapsible saw comprising an elongated, rigid, unitary, hollow, open-sided frame member defining a magazine, a plurality of saw blades dimensioned to be received in the magazine defined by said frame member, means pivotally connecting one end of each of said blades directly to one end of said frame member for pivotal movement of a selected blade about said pivot means to and from a storage position within the magazine and an operating position angularly disposed with respect to the frame member at the opposite side thereof from said magazine, a one-piece handle member, means pivotally connecting one end of said handle member directly to the other end of said frame member for rotation of the handle member about said pivot means relative to the frame between a collapsed position overlying at least a portion of the open side of said frame member to retain said saw blades in storage position in said magazine and an operating position projecting from the opposite side of the frame member with the free end of said handle member disposed adjacent the free end of said blade when the latter is pivoted to its said operating position, fastening means to connect the free end of the selected blade to said free end of the projected handle and apply the desired degree of tension to the blade, and means on said handle for retaining non-selected blades in the magazine in the operating position of the handle.

10. A collapsible saw comprising an elongated, rigid, unitary, hollow, open-sided frame member defining a magazine, at least one saw blade dimensioned to be received in the magazine defined by said frame member, means pivotally connecting one end of said blade directly to one end of said frame member for pivotal movement of said blade about said pivot means to and from a storage position within the magazine and an operating position angularly disposed with respect to the frame member at the opposite side thereof from said magazine, a one-piece handle member having a hand grip portion of U-shaped cross section to define a pocket, means pivotally connecting one end of said handle member directly to the other end of said frame member for rotation of the handle member about said pivot means relative to the frame between a collapsed position wherein at least a portion of said frame is nested in said pocket with the open side of said frame confronting the closed side of said pocket to retain said blade in storage position in said magazine and an operating position projecting from the opposite side of the frame member with the free end of said handle member disposed adjacent the free end of said blade when the latter is pivoted to its said operating position, means on said hand grip portion for detachably latching said handle to said frame in the collapsed position of the handle to retain said blade in storage position in said magazine, and fastening means to connect said free end of the blade to said free end of the projected handle and apply the desired degree of tension to the blade.

11. A collapsible saw as claimed in claim 10 wherein said means for detachably latching said handle to said frame comprises a lug carried by said hand grip portion operable to engage with said frame in the collapsed position of the handle.

References Cited by the Examiner

UNITED STATES PATENTS 1,565,861  12/1925  McIntire.

FOREIGN PATENTS 357,908  11/1905  France.

WILLIAM FELDMAN, *Primary Examiner.*

MILTON S. MEHR, *Examiner.*

R. V. PARKER, JR., *Assistant Examiner.*